(12) United States Patent
Golben (10) Patent No.: US 7,736,609 B1
(45) Date of Patent: Jun. 15, 2010

(54) HYDROGEN PURIFICATION SYSTEM

(75) Inventor: Peter Mark Golben, Florida, NY (US)

(73) Assignee: Ergenics Corp., Ringwood, NJ (US)

( * ) Notice: Subject to any disclaimer, the term of this patent is extended or adjusted under 35 U.S.C. 154(b) by 621 days.

(21) Appl. No.: 11/644,692

(22) Filed: Dec. 22, 2006

Related U.S. Application Data (60) Provisional application No. 60/752,596, filed on Dec. 22, 2005.

(51) Int. Cl.
B01D 53/50 (2006.01)
C01B 3/24 (2006.01)
F01N 3/10 (2006.01)

(52) U.S. Cl. .......................... 423/247; 423/650; 60/299

(58) Field of Classification Search ................. 423/246, 423/247
See application file for complete search history.

(56) References Cited

U.S. PATENT DOCUMENTS

| | | | |
|---|---|---|---|
| 4,302,436 A | 11/1981 | Sirovich | |
| 4,448,757 A * | 5/1984 | Barnwell et al. | 423/247 |
| 5,673,556 A | 10/1997 | Goldben | |
| 6,207,307 B1 * | 3/2001 | Van Keulen | 429/19 |
| 6,270,719 B1 | 8/2001 | Fetcenko | |
| 6,284,157 B1 * | 9/2001 | Eliasson et al. | 252/373 |
| 6,419,764 B1 | 7/2002 | Kamiya | |
| 6,508,866 B1 * | 1/2003 | Golben | 96/146 |
| 6,942,846 B1 * | 9/2005 | Eckardt et al. | 423/437.2 |
| 7,093,626 B2 | 8/2006 | Li | |

OTHER PUBLICATIONS

Sandrock, G.D., "State of the Art Review of Hydrogen Storage in Reversible Metal Hydrides for Military Fuel Cell Applications", 1997, Office of Naval Research, Ringwood, NJ.

* cited by examiner

*Primary Examiner*—Melvin C Mayes
*Assistant Examiner*—Kenneth Vaden
(74) *Attorney, Agent, or Firm*—Vangelis Economou; Economous IP Law (57) ABSTRACT

The present invention provides a system to purify hydrogen involving the use of a hydride compressor and catalytic converters combined with a process controller.

8 Claims, 10 Drawing Sheets

Figure 11

HYDROGEN PURIFICATION SYSTEM

REFERENCE TO RELATED APPLICATIONS

This is a non-provisional application of U.S. provisional application Ser. No. 60/752,596, filed on Dec. 22, 2005, which is incorporated herein by reference.

GOVERNMENT INTEREST

This invention was made with the support of the United States government under contract number DE-FC36-99GO10448 awarded by the United States Department of Energy. The government has certain rights to this invention.

FIELD OF THE INVENTION

The present invention provides a system and method for hydrogen purification to eliminate contaminants of hydrogen and to improve the performance of hydride alloys and other complex metal hydride storage materials used in conjunction with fuel cells and hydrogen compressors.

BACKGROUND OF THE INVENTION

Hydrogen often contains impurities that must be removed before it can be used in many applications, such as for producing power in PEM fuel cells. Today and in the immediate future, most hydrogen is produced via steam reforming of natural gas, so most common impurities are water vapour ($H_2O$), carbon monoxide (CO), carbon dioxide ($CO_2$), methane ($CH_4$) and Nitrogen ($N_2$). Of these impurities, CO is the most potent and it can rapidly poison metal hydride alloys, as well as fuel cell electrode catalysts.

Impurities interact with hydride alloys with varying effects such as follows:

Poisoning results in a rapid decrease in hydrogen capacity with cycling. Damage from poisoning tends to be localized on the alloy particle surface, so it is often possible to restore performance with little, if any, loss in capacity. Oxygen and CO are impurities that poison alloys.

Retardation is manifested by a reduction in absorption kinetics without loss in ultimate capacity. With enough time, full capacity can be achieved. Retardation is often a result of impure species forming weak bonds on the alloy surface that impede hydrogen absorption. Carbon monoxide and water vapor retard hydriding.

Reaction causes irreversible capacity loss through bulk corrosion of the alloy. Reaction results in the formation of very stable chemical compositions that do not reversibly hydride and cannot be easily returned to their original state. Active sulfur compounds such as $SO_2$ cause irreversible damage due to the reaction mechanism.

Innocuous Blanketing results from impure gas species congregating on the alloy surface and forming a blanket that reduces the rate of hydrogen absorption. Gases that cause blanketing, such as nitrogen and methane, are easily removed by venting.

Water vapor is the most common contaminant in hydrogen. It affects hydride alloys through the mechanisms of retardation followed by poisoning. When hydrogen absorption begins, water vapor is carried towards the alloy surface by the hydrogen. The water molecules gather and become concentrated on the alloy surface, slowing the passage of hydrogen to the alloy (retardation). Hydride alloys contain nickel, which normally acts as a dissociation catalyst for hydrogen molecules prior to absorption. The nickel can also act as a weak catalyst for dissociating water molecules. As water molecules are dissociated at the surface of the alloy particles, the resulting hydrogen would be absorbed into the alloy, but oxygen tends to react with the rare earth element (lanthanum or mischmetal) forming a stable oxide that is no longer available to hold hydrogen. Hydrogen absorption capacity decreases (poisoning). Nickel-metal hydride battery alloy development by the applicant and others stimulated a large body of research into the corrosion of hydride electrodes immersed in electrolytes.

Previous teachings of disproportionation resistant alloys and of methods that inhibit disproportionation of hydrides are described in commonly owned U.S. Pat. No. 6,508,866 "Passive Purification in Metal Hydride Storage Apparatus" issued on Jan. 21, 2003, and also of U.S. Pat. No. 5,673,556, entitled "Disproportionation resistant metal hydride alloys for use at high temperatures in catalytic invention incorporates by reference the previous teachings described in Applicant's U.S. Pat. No. 6,508,866 "Passive Purification in Metal Hydride Storage Apparatus," issued on Jan. 21, 2003, and also U.S. Pat. No. 5,673,556, entitled "Disproportionation Resistant Metal Hydride Alloys for Use at High Temperatures in Catalytic Converters," issued on Oct. 7, 1997. Both of these patents are commonly owned by Ergenics Corporation of Ringwood, N.J., USA, the assignee of the present invention.

A number of corrosion inhibiting additives, such as cobalt and tin, have been identified for immersed alloys, and we have found these to have positive impact on preventing poisoning in gaseous systems as well. U.S. Pat. No. 6,508,866 describes a method of removing vapor and oxygen from hydrogen within a hydride alloy bed. This in-situ purification process permits the alloy to operate as if it was absorbing clean, dry hydrogen. Named "Passive Purification", the process includes catalytic recombination of oxygen impurities, physical water removal and the use of corrosion inhibitors in the alloy formulation. During desorption of dry hydrogen from the alloy, water that was removed during the absorption process is evaporated into the hydrogen as it exits the bed. The Passive Purification process successfully permits cycling hydride alloys with hydrogen that is saturated with water vapor and contains some oxygen.

It has been suggested, in Sandrock, G. D. 1997. "State of the Art Review of Hydrogen Storage in Reversible Metal Hydrides for Military Fuel Cell Applications," Office of Naval Research. Ringwood N.J.: SunaTech, Inc., that a single monolayer of Carbon Monoxide (CO) and, to a lesser degree, Carbon Dioxide ($CO_2$) prevents hydrogen absorption into hydride alloys, probably by forming Ni-carbonyl bonds on the alloy surface which deactivate the dissociative properties of the nickel. Sandrock shows that there is almost no degradation of performance in cycling at a temperature of 115° C. $LaNi_5$ alloy in hydrogen contaminated with CO. This suggests that an "elevated temperature desorption" can remove the CO molecule from the alloy to restore full performance.

Nitrogen, methane, noble gases and ammonia do not react with hydride alloys, but if present in enough quantity, can form an innocuous blanket, which reduces the rate of the hydrogen absorption to a crawl. Intuitively, during a desorption cycle, hydrogen that is released from the hydride alloy particles should be able to sweep away impurities that cause innocuous blanketing and they can be either removed from the hydrogen stream by an automatic venting process or be allowed to pass through the compressor.

One application of hydrogen is its use in hydride compressor systems. In such systems, hydrogen is generally absorbed in a reversible metal hydride alloy at low pressure in a hydride bed which is subsequently heated and hydrogen is released at high pressure. Continuous compression is achieved by having two containers/hydride beds in a parallel configuration. One being cooled by water while hydrogen is absorbed until it is full while the other is heated with hot water to release the hydrogen. With each thermal cycle, the alloy in the containers are first filled to capacity and then emptied. Gaseous impurities, within the hydrogen stream, can react with the hydride alloy and reduce its hydrogen storage capacity and/or impede the absorption of hydrogen. The result will be a decline in hydrogen throughput with each thermal cycle. Generally, for this reason, thermal compression of hydrogen using metal hydrides has been restricted to relatively pure hydrogen streams (99.995%) that have less than 50 ppm of active gas impurities.

Presently hydrogen is purified with Pd alloys or oxygen and water scavengers as well as with filters which selectively retain contaminants and let hydrogen pass through. All these methods involve high cost and can only be implemented in stationary distribution centres. In fact the quality of hydrogen to be sold in the different stationary distribution centres can vary appreciably from one to another because of the different production methods and purification methods used. This can only impair the confidence of end users in the future as the reliability of the hydrogen source can be unpredictable. In addition, fluctuations in the quality of hydrogen may be anticipated up to the point that the performance of vehicles could be reduced.

In commonly owned U.S. Pat. No. 5,673,556, entitled "Disproportionation resistant metal hydride alloys for use at high temperatures in catalytic converters," hydrogen purification systems may be used to remove impurities. However, such purification systems are often complex, expensive to maintain, and, for hydrogen produced at atmospheric pressure, would require their own motive force in the form of a mechanical compressor or blower. The present invention offers a simple, compact and mobile purification system and method for hydrogen purification.

BRIEF DESCRIPTION OF THE DRAWINGS

The present invention will be described further below with reference to the accompanying drawings in which.

SUMMARY OF THE INVENTION

The present invention provides a process or system for purifying hydrogen comprising the steps of (i) feeding impure hydrogen through a first catalytic bed contained within a catalytic converter to convert CO contained within the impure hydrogen to $CH_4$; (ii) passing the impure hydrogen with $CH_4$ emitted from the catalytic bed through check valves of an hydride compressor; (iii) activating the at least one check valve and the at least one solenoid valve to vent the impure hydrogen; (iv) mixing the vented impure hydrogen with air and sending it to a second catalytic bed in the catalytic converter to burn the impure hydrogen; and (v) sending the combustion product of the catalytic bed of the converter to a furnace heater of the hydride compressor to recover its heat value.

The present invention further provides a process to purify hydrogen comprising the steps of (i) feeding impure hydrogen through first a counter flow heat exchanger and subsequently to an electric heated catalytic converter at 300 degree Celsius to convert CO contained within the impure hydrogen to $CH_4$; (ii) passing the impure hydrogen with $CH_4$ emitted from the catalytic bed back through a counter flow heat exchanger; (iii) sending the impure hydrogen with $CH_4$ at ambient temperature to the first stage of the hydride compressor; (iv) passing the impure hydrogen with $CH_4$ emitted from the catalytic bed through at least one check valve and the at least one solenoid valve to vent the impure hydrogen; and (v) sending the hydrogen outlet at ambient temperature to the ambient fluid outlet of the hydride compressor to recover its heat value.

In a further aspect the present invention provides a catalytic converter for the elimination of CO and $CO_2$ from Hydrogen gas comprising at least two concentric tubes, the first tube containing the electric heating element operable to heat up the unit to high temperatures and the second tube containing catalytic material operable to convert CO to $CH_4$.

The present invention further provides a catalytic converter for the elimination of CO and $CO_2$ from impure Hydrogen gas and for the recovery of the heat value of the impure Hydrogen gas comprising at least two concentric tubes, the first tube containing catalytic material operable to convert CO to $CH_4$, and the second tube containing catalytic material operable to burn hydrogen to generate heat, both tubes being operable to allow for the passage of hydrogen therethrough; and an electric heater located between the first tube and the second tube to heat up the unit to high temperatures.

In another aspect the present invention provides a system for the process described herein including the catalytic converter disclosed herein.

DETAILED DESCRIPTION OF THE PREFERRED EMBODIMENTS

The present invention provides a system to purify hydrogen involving the use of a hydride compressor and catalytic converters combined with a process controller. The latter activates a series of check valves and solenoid valves which permits venting the contaminants contained within the hydrogen stream. The system can be a portable unit that can be used on board vehicles or that may be used in central distribution centres. The system is simple and inexpensive and can operate at low cost because there is no need to use consumables, such as disposable filters, scavengers, etc., while the energy requirement is low as the heat capacity of the system is preserved by recirculation of the high temperature heat sources or exhaust gas.

The system involves a catalytic converter for use in a hydride compressor in which the venting of the contaminants is made after the first stage compression. This novel system can be used for hydrogen purification in several advanced hydrogen production processes such as, but not exclusively: algal hydrogen production (photobiological), biomass via fast pyrolysis, biomass in supercritical water, plasma catalytic reforming of natural gas, PEM electrolysis, Photoelectrochemical direct conversion and sodium borohydride production.

The present invention involves pre-treating the hydrogen prior to compression using a catalytic converter. In this device CO and $CO_2$ is converted to methane and water vapour before it enters the subsequent metal hydride beds in the compressor. Hydride alloys see methane as an inert gas species, suggesting that it can be removed from the hydrogen stream during an inert gas venting process after the first stage compression.

Catalytic conversion of CO and $CO_2$ is well known. Combining the conversion with an hydride compressor and permitting the inert gas venting simultaneously with heat recovery of the gas in the catalytic converter and hot fluid and ambient fluid streams of the hydride compressor is not known.

The invention incorporates by reference the previous teachings described in Applicant's U.S. Pat. No. 6,508,866 "Passive Purification in Metal Hydride Storage Apparatus" issued on Jan. 21, 2003, and also of U.S. Pat. No. 5,673,556, entitled "Disproportionation resistant metal hydride alloys for use at high temperatures in catalytic converters," issued on Oct. 7, 1997, both of which are commonly owned by Ergenics Corporation of Ringwood, N.J., USA, the assignee of the present invention.

The '866 Patent describes the use of a noble metal in powder form introduced in the metal hydride particles that acts as a catalyst and delays absorption of the impurities in the metal hydride. In the present application the same catalytic material may be used, however it is not incorporated in the metal hydride particles but held in a catalytic converter through which the hydrogen is passed prior to passing through the metal hydride particles. The use of the catalytic material in the present invention allows for higher temperatures to be used which assists in improving the efficiency of the system in which it is used.

The '556 Patent teaches metal hydrides for absorbing hydrogen which are capable of undergoing repeated charge/discharge cycles of absorbing and desorbing hydrogen at high temperatures and cycles through a high temperature followed by a low temperature. These alloys, intended for use in devices such as heat pumps, heat exchangers, energy storage devices, thermal actuators, temperature sensors and electrochemical cells generally comprise the chemical formula $AB_2$, where A is selected from the group of elements consisting of Ti, Hf, Y, B is selected from the group of elements consisting of Nb, Ni, Co, and Fe, and x is in a range from 0.05 to approximately 0.80, and specific alloys comprise hafnium-nickel (HfNi), hafnium cobalt (HfCo), hafnium-iron ($Hf_2Fe$), yttrium-nickel (YNi) and titanium-niobium $Ti_{1-x}Nb_x$, where x is in a range of from $0.05<x<0.60$. Optionally, additives such as Al, B, Co, Cr, Cu, Hf, Mn, Mo, Ni, Fe, Ga, Ge, Si, Sn, Ta, V and Zr may be added in proportions up to about 10 atomic percent relative to the base alloy set forth above to provide for specific customized applications. Additionally, methods of use for high temperature disproportionation resistant alloys where the temperature is cycled through an elevated and a lower temperature are disclosed.

The invention combines the capability of hydrides for storing materials and the hydrogen based compressor required to increase the hydrogen pressure for numerous applications. The integrated system can be made at low cost as it involves a series of low cost components.

The present invention provides an apparatus and/or method that may reduce or eliminate hydride alloy degradation due to poisoning from CO and $CO_2$ impurities. The apparatus and/or system that remove CO and $CO_2$ from the hydrogen stream which may protect downstream equipment, such as fuel cell electrode catalyst. The in-situ removal within a hydride compression system may obviate or greatly relax any need for other methods such as pressure swing adsorption processes.

The energy penalty associated with purification can be minimized through the integration of a compressor's closed loop heating-cooling system with a catalytic regenerative heat exchanger.

Turning to FIGS. 8 through 11 one embodiment of the system incorporating the catalytic converter of the present invention will now be described in further detail. The dual electric and catalytically heated converter is indicated generally at numeral 10.

Figure 9:
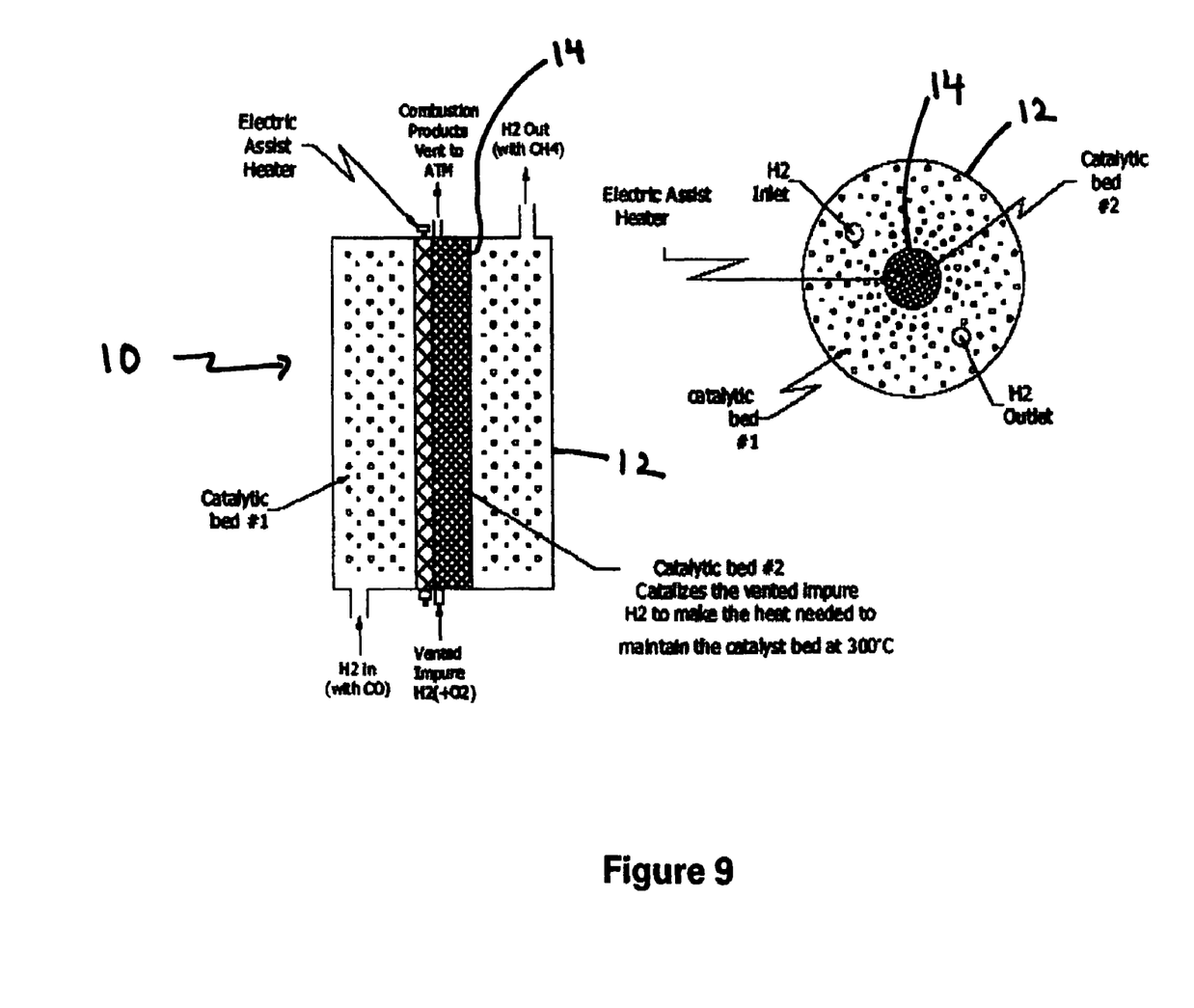
FIG. 9 is a cross section view of the dual electric and catalytic converter of FIG. 8.

As can be seen in FIG. 9, the catalytic converter 10 comprises a first tube 12 and a second tube 14 concentrically located within the first tube 12. It should be noted that the configuration of the concentric tubes is merely a preference and that one tube may be located within a second tube at any position provided that the catalytic converter functions in the manner described herein. The tubes may be made from any material that can withstand the process conditions, for example stainless steel or aluminium. Such tubes are generally known and used be persons skilled in the art. The size of each tube to be used may vary depending on the required capacity of each tube. In a preferred embodiment the tubes are manufactured from the same material, however it will be understood that they may also be manufactured from different material. The thickness of each tube may also vary depending on the pressure requirements of the converter in which it is to be used. Methods of assessing the required thickness for each tube are also well known to those skilled in the art.

In each of the first and second tubes 12, 14 there is located catalytic material 16, 18. The catalytic material 16, 18 found in each tube is different. The catalytic material 16 in first tube 12 fills the space between the outside surface of second tube 16 and the inside surface of first tube 12. The catalytic material 16 found in first tube 12 converts CO into $CH_4$. In a preferred embodiment, the catalytic material is made of a blend of Molecular Sieve 4A (18×30 mesh beads) with Pd black (Engelhard, Product No. 53113) and Pt black (Engelhard, Product No. 53005) that are mixed together. Then this mixture is mixed with Pd on $Al_2O_3$ beads (of about ⅛ inch diameter) which are made by Resources Systems Inc. It will be understood that other catalytic material may be used provided that it reacts or converts CO into less damaging species without being consumed in the process. Examples of such material include, but are not limited to precious metal catalysts which are metals known to provide catalytic activity without oxidizing.

The second tube 14 burns the vented impure $H_2$ to generate the heat required to keep the bed at 300° C. and/or in excess of 300° C. The second tube 14 contains catalytic material that is made from Pd black.

Figure 10:
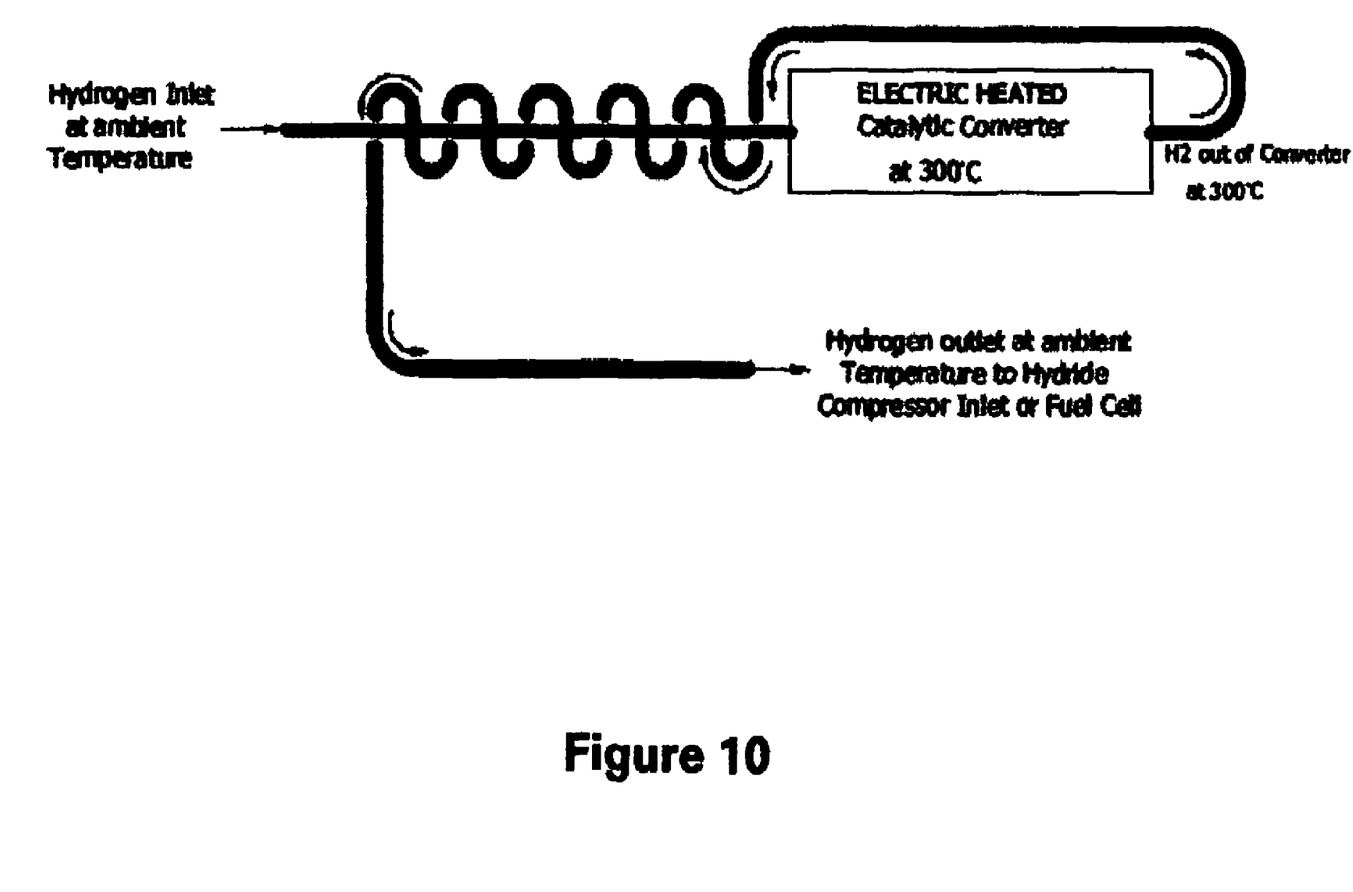
FIG. 10 is a schematic of the flow of hydrogen in and out of the dual electric and catalytic converter of the present invention.
Figure 11:
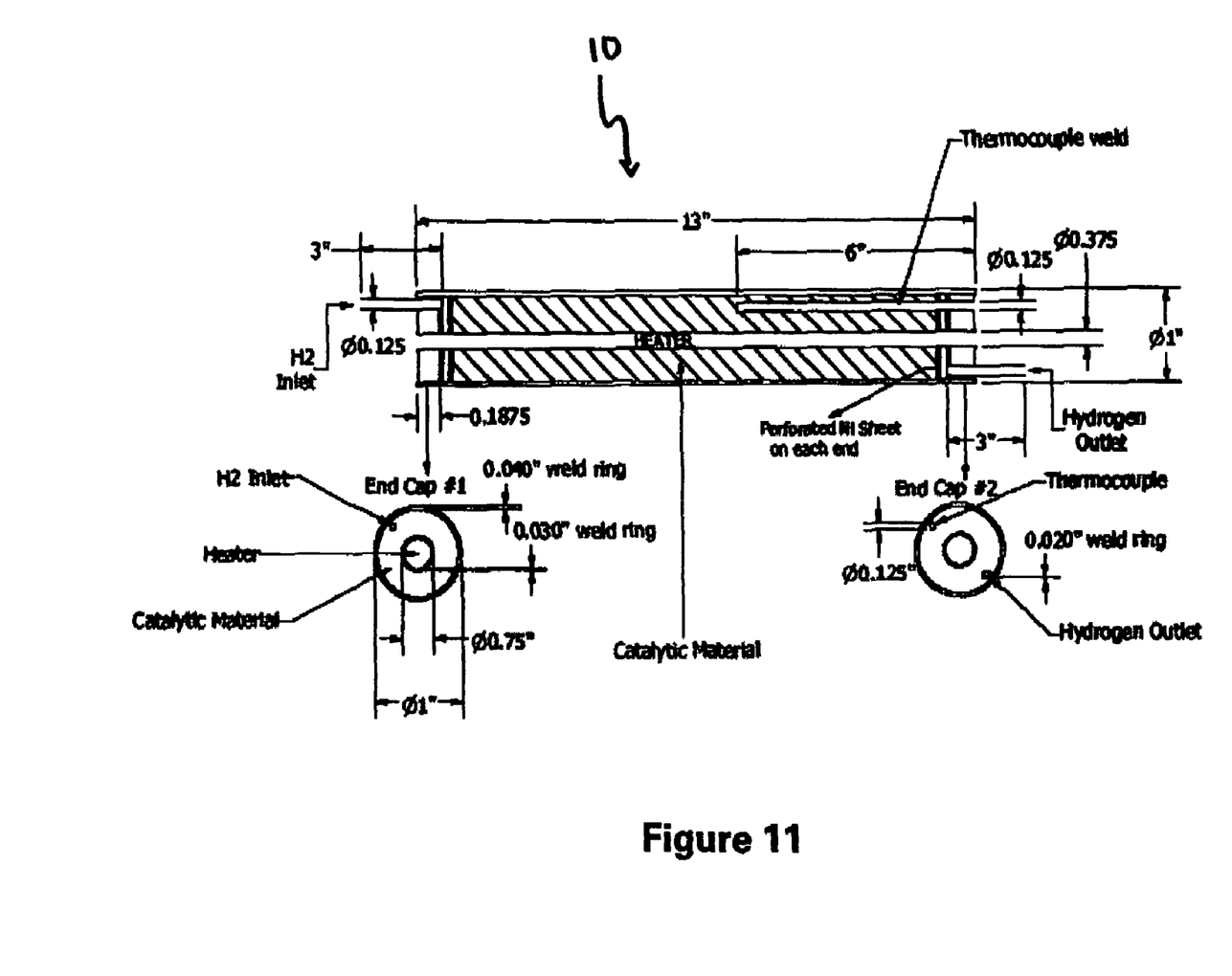
FIG. 11 is a cross sectional view of the electric heater catalytic converter including end views.

The electrically heated catalytic converter with counter flow heat exchanger is shown in FIGS. 9 through 11. The contaminated hydrogen at ambient temperature feeds the counter flow heat exchanger and catalytic converter at 300 degrees Celsius. The contaminated hydrogen is then recalulated to the counter flow heat exchanger to recover the heat value and is then sent to the hydride compressor inlet or to the fuel cell.

The electrically heated catalytic converter of FIG. 11 is made of two concentric tubes. The central tube contains the electric heater while the space contained between both tubes contains the catalytic material and a thermocouple.

Figure 8:
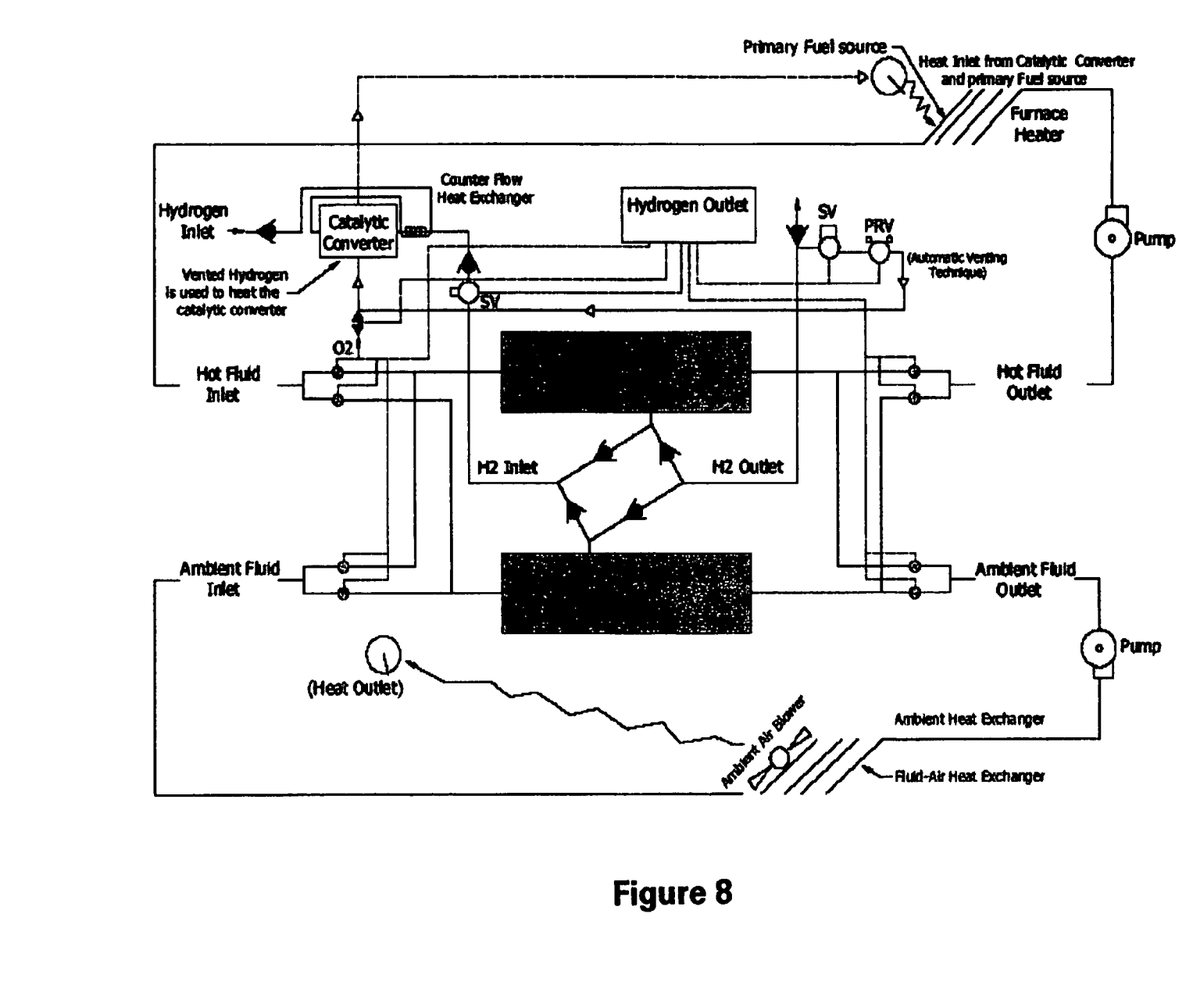
FIG. 8 is a schematic of a hydrogen purification system using the dual electric and catalytically heated converter of the present invention.

Turning to FIG. 8, in another aspect the present invention provides a process to purify hydrogen comprising the steps of (i) feeding impure hydrogen to a catalytic converter, (ii) passing the impure hydrogen through check valves of the hydride compressor, (iii) sending the impure hydrogen through a series of check valves and solenoid valves that are activated by a PLC controller and vent the impure hydrogen; and (iv) mixing the vented impure hydrogen with air and sending it to a second catalytic bed in the catalytic converter to burn the impure hydrogen; and (v) sending the combustion product of the catalyst bed of the converter to the furnace heater of the hydride compressor to recover its heat value.

In another aspect of the present invention the process to purify hydrogen comprises the steps of (i) feeding impure hydrogen to a catalytic converter, (ii) passing the impure hydrogen through a counter flow heat exchanger to recover the heat and subsequently sending the hydrogen at ambient temperature to the hydrogen compressor inlet or the fuel cell.

As stated above the present invention also provides a process for purifying hydrogen. The process includes the steps of feeding impure hydrogen into a catalytic converter and passing the impure hydrogen through check valves and solenoid valves that are activated during the venting process of the system. The purified hydrogen is then used in the subsequent steps of the hydride compressor.

The examples provided below show the effect of using hydrogen directly in a hydride compressor system compared with using purified hydrogen according to the process of the present invention.

Example 1

Alloy Capacity

Figure 1:
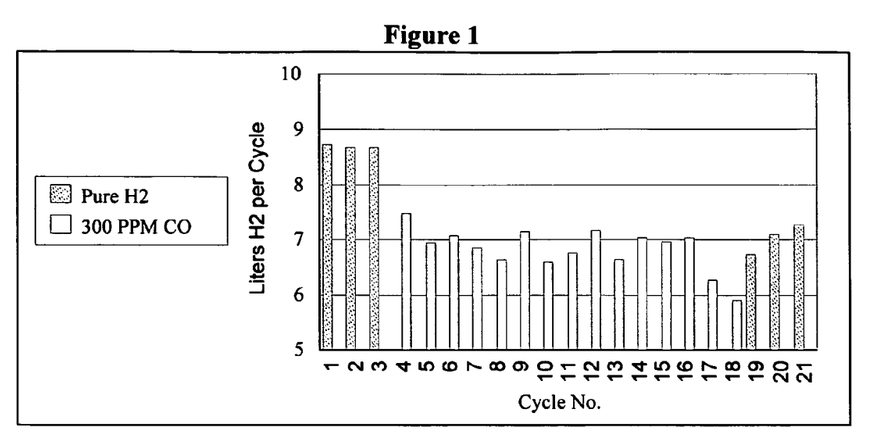
FIG. 1 shows the effect of CO on alloy capacity with cycling in a prior art compressor.
Figure 2:
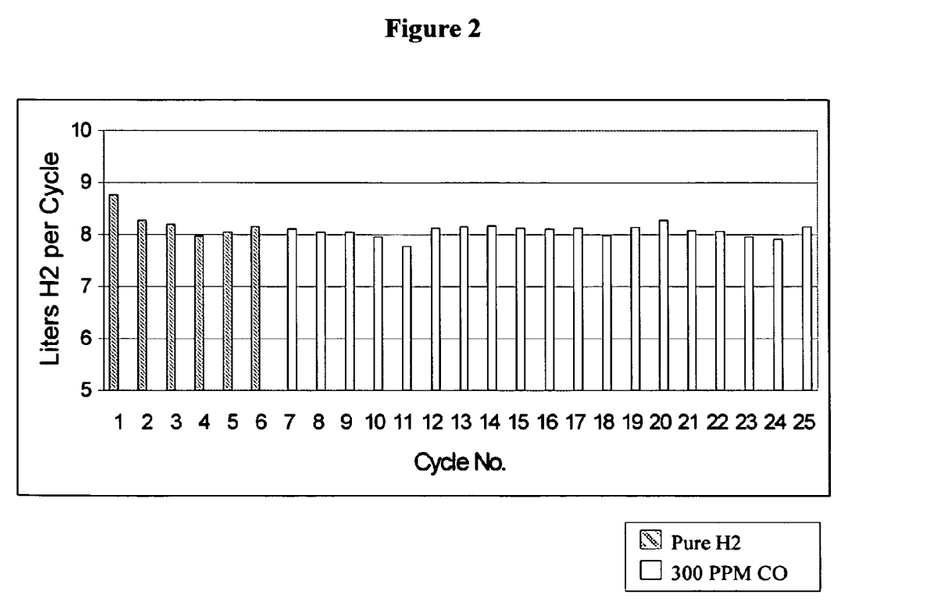
FIG. 2 shows the effect of CO on alloy capacity with cycling in a compressor using the process of the present invention.

FIG. 1 and FIG. 2 show the effect of CO on alloy capacity with cycling. FIG. 1 shows that when hydrogen with CO is fed to the compressor, alloy capacity undergoes a gradual reduction as it is cycled. The positive impact of the new CO conversion process is shown in FIG. 2, where alloy capacity is stable as it is cycled.

Figure 3:
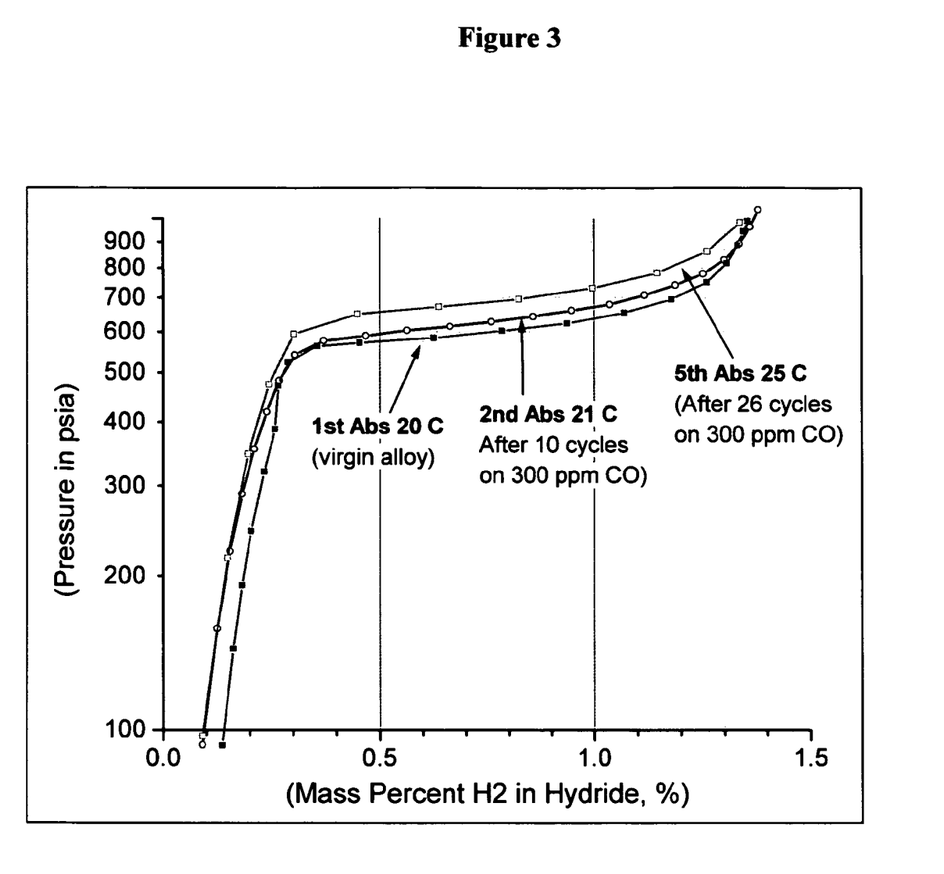
FIG. 3 shows PCT tests on a hydride alloy used in the present invention.

During testing with CO, the compressor alloy behaviour was periodically checked for changes by Pressure-Composition-Temperature isotherm tests. FIG. 3 shows that the CO conversion feature allows the compressor alloy to maintain its performance over repeated cycles. In order to verify that the metal alloy performance or PCT performance was not being effected by potential test stand leakage, two additional absorption tests, numbers 3 and 4, were done after 10 cycles. The results conformed to the isotherm of "Abs. 2" and have been omitted from FIG. 3 for clarity. The slight differences in plateau pressure are a result of ambient temperature differences on the days the tests were performed.

Example 2

CO Conversion and Removal

Figure 4:
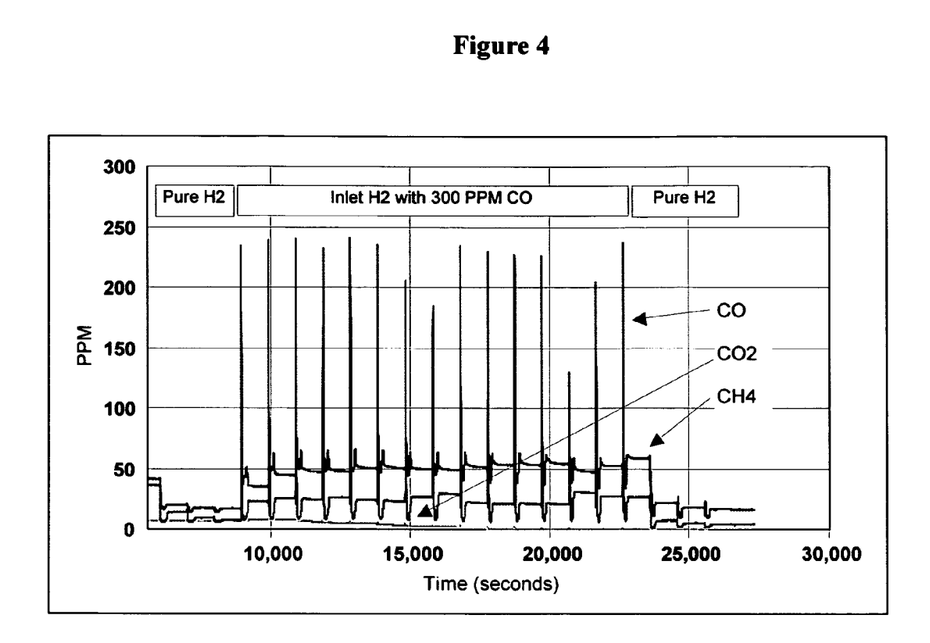
FIG. 4 shows the outlet hydrogen composition from a compressor without using the process of the present invention.
Figure 5:
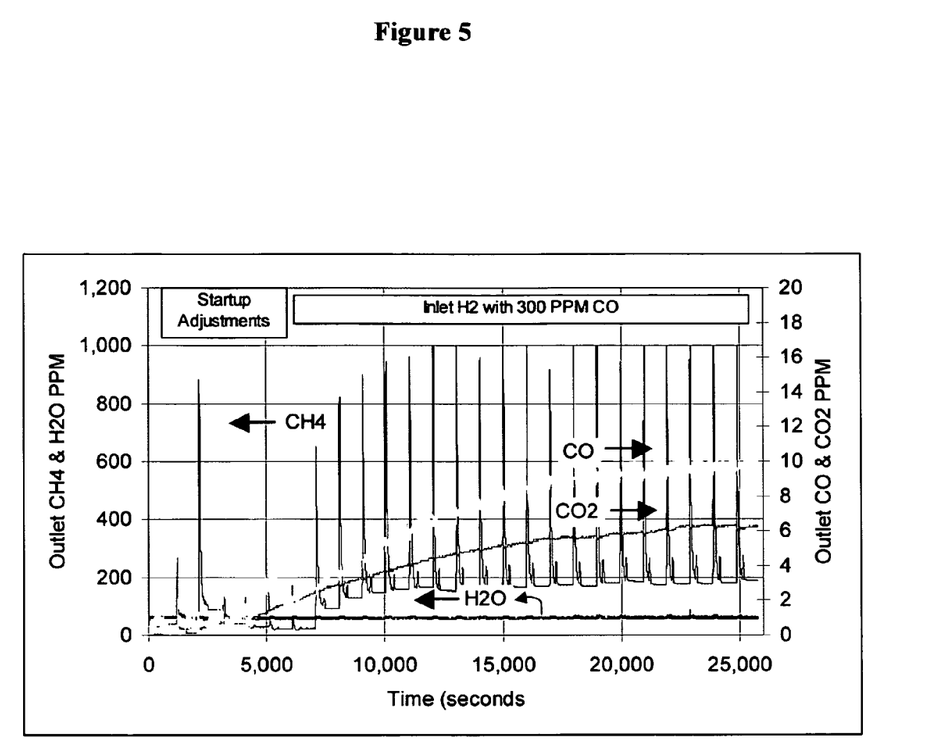
FIG. 5 shows the outlet hydrogen composition from a compressor using the process of the present invention.
Figure 6:
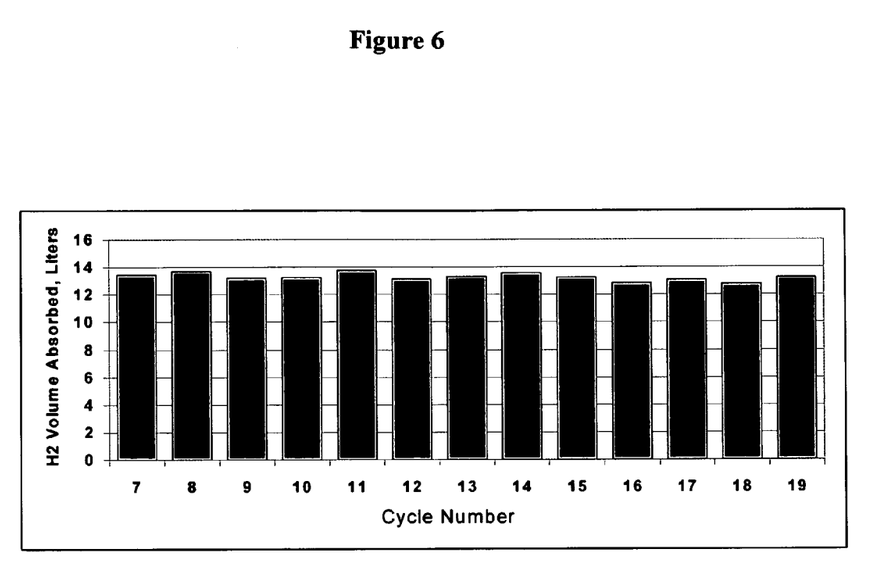
FIG. 6 shows the Hydrogen volume absorbed compared to cycle number for an alloy used in the process of the present invention.

The composition of the compressor discharge both without and with the CO conversion feature is depicted in FIG. 4 and FIG. 5 respectively. Without the CO conversion feature, 300 ppm inlet CO results in CO outlet concentrations approaching 250 ppm. Note that the passive purification process converts some of the incoming CO to $CH_4$ (~50 ppm). Also, the effect of dynamic adsorption can be seen with the momentary spike in outlet $CH_4$ levels at the beginning of each desorption cycle.

The CO conversion process of the present invention results in a reduction of CO to the 10 ppm level necessary to protect fuel cell catalyst. FIG. 5 illustrates that most of the CO is converted into methane ($CH_4$) and the methane is released in large spikes (>1,000 ppm) at the beginning of each cycle. This suggests that methane can be removed from the hydrogen stream via inert gas venting using an economically small amount of hydrogen. A momentary opening of the vent valve should sweep the methane away. Ultimately, the vent gas will be routed to the hot water heater for recapture of its heating value.

The CO analyzer was reviewed to assist with an explanation of the outlet CO increase and the increase was determined as being due to analyzer drift associated with sample temperature, not a true increase in concentration. Analyzer calibration procedures and the sample collection tubing were modified to increase analyzer accuracy.

Example 3

CO Inlet Content of 1,000 ppm

Figure 7:
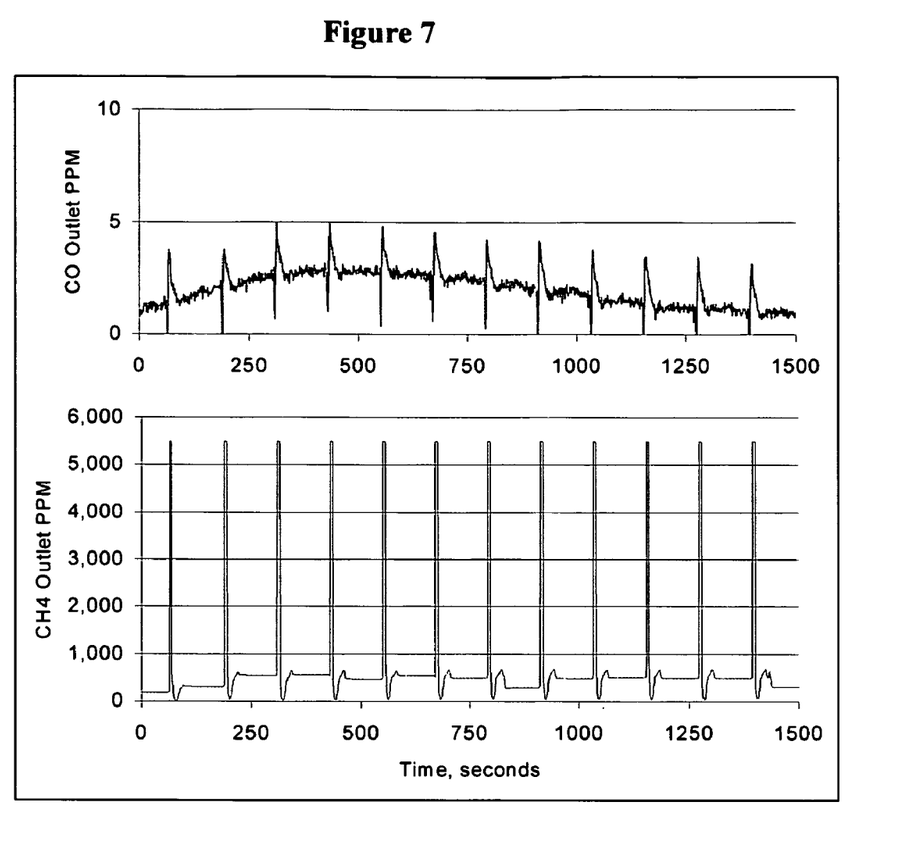
FIG. 7 shows the CO and $CH_4$ outlet ppm over time from an alloy used in the process of the present invention.

The composition of the compressor discharge with the CO conversion process of the present invention is depicted in FIG. 7. The CO elimination process results in a reduction of CO from 1,000 ppm at the compressor inlet to less than 5 ppm, in order to protect fuel cell catalyst. FIG. 7 also shows that most of the CO is converted into methane ($CH_4$) and the methane is released in large spikes (>5,000 ppm) at the beginning of each desorption cycle. This suggests that methane could be removed from the hydrogen stream via inert gas venting, using an economically small amount of hydrogen vented to atmosphere.

The term "inert gas" as used in this patent application refers to gas species that do not react with hydride alloys at the compressor's modest operating temperatures. "Inert gas" includes noble gases, such as helium and argon, as well as nitrogen and methane.

During a hydrogen absorption cycle, inert gas impurities flow with the hydrogen into the hydride bed, but are not absorbed by the hydride alloy. They tend to concentrate on the surface of the alloy particles within the alloy bed. In order to remove these impurities from the hydrogen stream, the hydride compressor includes a fast acting, solenoid vent valve. Hydrogen released during a momentary opening of the vent valve sweep away inert gas species from the hydride bed. The vented gas will be routed to the hot water heater to recapture its heating value.

It will be understood that the system of the present invention may also include some of the additional features described in U.S. Pat. No. 6,508,866, the contents of which are incorporated herein by reference. For example, the addition of an additive to the metal hydride material that includes both a powder desiccant and a corrosion resistant additive to the metal hydride material may be incorporated. Alternatively, the additives may be utilized within the desiccant material that cause inert gaseous impurities to combine with other elements so as to form a compound that is absorbable by the desiccant additive.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments. Further, all of the claims are hereby incorporated by reference into the description of the preferred embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A catalytic converter for the elimination of CO and $CO_2$ from Hydrogen gas comprising:
   a catalytic converter unit;
   at least two concentric tubes, the first tube containing an electric heating element operable to heat up the first tube and its contents to high temperatures and the second tube containing catalytic material operable to convert CO and $CO_2$ to $CH_4$, and
   a gas vent, including a fast acting, valve, providing for quick, momentary venting of $CH_4$ at the beginning of each hydryding-dehydriding cycle, positioned and oriented to enable the gas vent to remove a small amount of hydrogen with a major portion of the impurities, including the $CH_4$, from the at least two concentric tubes of the catalytic converter.

2. The catalytic converter for the elimination of CO and $CO_2$ according to claim 1 wherein the electric heating element is operable to heat up the unit to high temperatures in excess of 300 degrees Celsius.

3. A catalytic converter for the elimination of CO and $CO_2$ from impure Hydrogen gas and for the recovery of the heat value of the impure Hydrogen gas comprising:
   at least two concentric tubes, the first tube containing catalytic material operable to convert CO and $CO_2$ to $CH_4$, and the second tube containing catalytic material operable to burn hydrogen to generate heat, both tubes being operable to allow for the passage of hydrogen therethrough;
   an electric heater located between the first tube and the second tube to heat up the unit to high temperatures, and
   a fast acting, solenoid vent valve providing for quick, momentary venting of $CH_4$ at the beginning of each hydryding-dehydriding cycle, positioned and oriented to enable the vent valve to momentarily open so as to remove a small amount of hydrogen with a major portion of the impurities, including the $CH_4$, from the hydride bed of the catalytic converter.

4. The catalytic converter for the elimination of CO and $CO_2$ according to claim 3 wherein the electric heating element is operable to heat up the unit to high temperatures in excess of 300 degrees Celsius.

5. The catalytic converter for the elimination of CO and $CO_2$ according to claim 3 wherein the first concentric tube contains catalytic material comprising a mixture of $Al_2O_3$ beads with a blend of Pd black and Pt black.

6. The catalytic converter for the elimination of CO and $CO_2$ according to claim 5 wherein the second concentric tube contains catalytic material comprising Pd black.

7. The catalytic converter for the elimination of CO and $CO_2$ according to claim 3 wherein the second concentric tube is nested within the first tube.

8. The catalytic converter for the elimination of CO and $CO_2$ according to claim 7 wherein the second concentric tube is concentric with the first tube.

* * * * *